Feb. 8, 1927.
J. W. SCOTT, JR
1,616,926
MOTION PICTURE APPARATUS
Filed July 15, 1925
FIG_1.
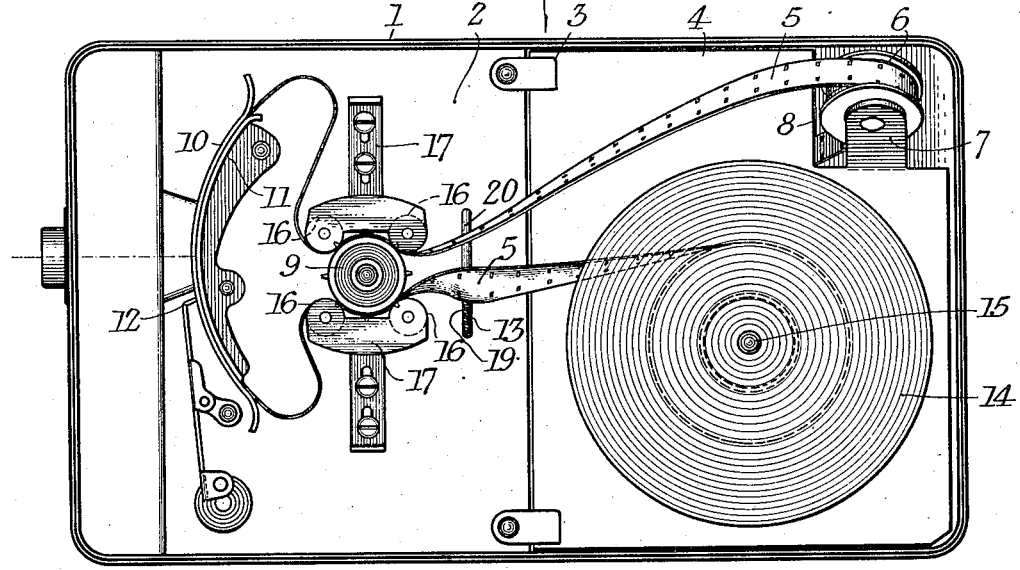
FIG_2.
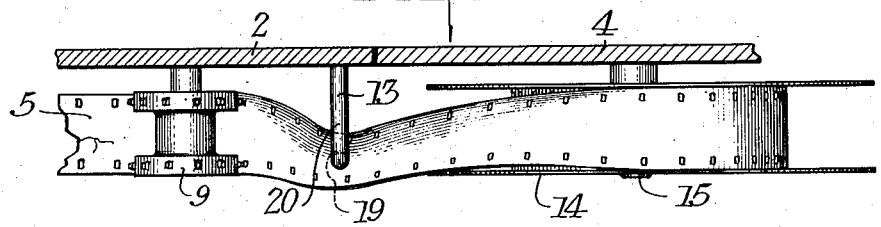
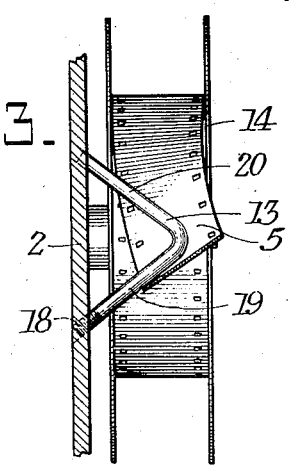
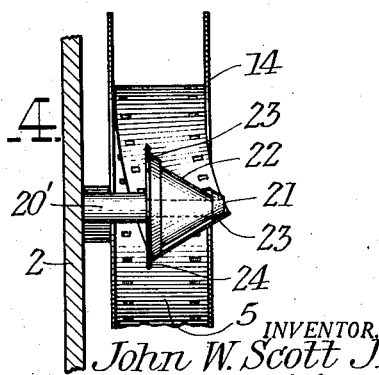
INVENTOR,
John W. Scott Jr.,
BY R. L. Stinchfield
N. M. Perrins
ATTORNEYS.

Patented Feb. 8, 1927.

1,616,926

UNITED STATES PATENT OFFICE.

JOHN W. SCOTT, JR., OF ROCHESTER, NEW YORK, ASSIGNOR TO EASTMAN KODAK COMPANY, OF ROCHESTER, NEW YORK, A CORPORATION OF NEW YORK.

MOTION-PICTURE APPARATUS.

Application filed July 15, 1925. Serial No. 43,807.

This invention relates to motion picture apparatus and more specifically to a structure designed to assist in the winding of a film band upon a reel having flanges between which the band fits rather snugly.

In small motion picture cameras intended particularly for use by amateurs and frequently driven by small motors it is especially desirable that the film shall wind up smoothly and easily. If the film strip fits snugly between the flanges of the reel, or if the flanges are slightly bent, then the film will tend to stick toward the outer edge and not be drawn tightly down around the core, the winding tension not being very great. On the other hand if considerable tolerance is permitted, there is very great danger of light fogging the edges of the film, and as the film and its borders are very narrow, an amount of edge fog that is permissible in ordinary camera use will extend into the picture area.

I have overcome this difficulty in placing in line with the reel an inclined guide which serves no other purpose than to tilt the film so that it does not contact the flanges of the reel as it is wound between them until it reaches its final position in the coil.

Reference will now be made to the accompanying drawing in all the figures of which the same reference characters indicate the same parts throughout:

Fig. 1 is a side view of an open camera embodying my invention;

Fig. 2 is a fragmentary plan showing the film passing the sprocket and guide to the reel;

Fig. 3 is a fragmentary section showing the film passing the guide to the reel;

Fig. 4 is a similar view showing a modified guide;

In Figure 1 is shown a camera of the type disclosed in a patent to Adolph Stuber and Ernest E. Uunderwood, No. 1,548,960 granted Aug. 11, 1925. Only such parts are shown as are deemed necessary to a complete understanding of my invention.

As illustrated, the camera comprises a casing 1, one side of which is removable and is not shown. A central longitudinal partition 2 is located in the front part, and has hinged thereto at 3 a rear partition member 4 behind which is located a seat for the supply reel of film (not shown). The film 5 passes from this supply reel over a pulley 6 carried on an inclined support 7 adjacent an aperture 8 in the partition member 4 and thence over sprocket 9, between curved gate members 10 and 11 through which it is drawn by the intermittent claw 12, again over sprocket 9, past the inclined guide member 13 to the wind-up reel 14 on shaft 15 carried by member 4. The film is held against the sprocket by rollers 16 carried on the sliding supports 17.

It is to be noted that sprocket 9 and reel 14 are in line, and were it not for member 13, the film would be drawn in a straight path from one to the other. The member 13 as shown consists of a bar screwed at an angle into partition 2 at 18 and bent over so that its end is forced into the partition. It thus has a lower inclined reach 19 constituting a guide for the film and an upper strengthening reach 20. The film contacts the part 19 and is twisted or distorted from its normal path so that as it passes between the flanges its effective width is less than the distance between the flanges, and it either does not contact either flange, or, if it contacts one, the frictional resistance is slight. The film band will nevertheless be drawn snugly down on the core and wound in tight convolutions, even though it fits quite tightly between the flanges.

It will be seen that by this structure I am able to satisfy the apparently contradictory requirements that the film shall fit the flanges rather closely and still be readily wound upon the reel.

An alternative form of guide is shown in Fig. 4. The post 20' extends perpendicularly from partition 2 and carries a conical roller 21, having the intermediate part of its wall cut away at 22 leaving bearing portions 23 for the borders of the film. A flange 24 bears against one edge of the film.

It is to be understood that the above embodiments are by way of example and that I contemplate as included in my invention all such modifications and equivalents as fall within the scope of the appended claims.

Having thus described my invention, what I claim as new and desire to secure by Letters Patent is,—

1. The method of winding a film band from a supply means to a reel in alignment therewith and having flanges separated by a distance approximately the width of the band that comprises twisting the band so that it is positioned angularly to the flanges as it enters between them.

2. In a motion picture apparatus, means for supporting a take-up reel, in a definite position, means in alignment with such position for directing a film band to a reel in such position, and means between the directing means and the position of the reel positioned to engage and twist a film band as it passes from the directing means to a reel in such position.

3. In motion picture apparatus, a driven take-up reel having separated flanges, means in alignment therewith for directing a film thereto, and an inclined guide member between the reel and the directing means and adapted to engage and twist a film band as it passes from the directing means to the reel.

4. In combination, a motion picture apparatus having a driven take-up reel with spaced flanges, means in alignment therewith for directing film thereto, a film strip having a width approximating the distance between the flanges and passing from the directing means to the reel and a guide member between the directing means and the reel adapted to engage and twist the film at an angle, whereby it may readily pass between the flanges of the reel.

5. In combination, a motion picture camera having a driven take-up reel with spaced flanges and a film feeding sprocket in alignment therewith, a light sensitive film having a width to fit snugly between said flanges and fed by said sprocket to the take-up reel, and a guide member with a surface inclined with respect to a line between the sprocket and the reel and adapted to contact and twist the film at an angle, whereby it may readily pass between the flanges of the reel.

Signed at Rochester, New York, this 13th day of July, 1925.

JOHN W. SCOTT, Jr.